United States Patent
Gorsuch

[19]

[11] Patent Number: 6,042,919
[45] Date of Patent: Mar. 28, 2000

[54] STRUCTURALLY STABLE OPTICAL DATA STORAGE MEDIUM

[75] Inventor: Thomas Gorsuch, Plymouth, Minn.

[73] Assignee: Zomax Optical Media, Inc., Plymouth, Minn.

[21] Appl. No.: 09/073,996

[22] Filed: May 7, 1998

[51] Int. Cl.⁷ .................................................. B32B 3/00
[52] U.S. Cl. ........................ 428/64.1; 428/644; 428/457; 428/913; 430/270.11; 430/495; 430/945; 369/283; 369/288
[58] Field of Search .................................. 428/64.1, 64.2, 428/64.4, 457, 913; 430/270.11, 495.1, 945; 369/283, 280

[56] References Cited

U.S. PATENT DOCUMENTS

| | | |
|---|---|---|
| 4,579,777 | 4/1986 | Honguu et al. . |
| 4,695,510 | 9/1987 | Sawamura et al. . |
| 5,492,773 | 2/1996 | Sekiya et al. . |
| 5,633,746 | 5/1997 | Sekiya et al. . |
| 5,679,429 | 10/1997 | Hintz ....................................... 428/64.1 |
| 5,882,759 | 3/1999 | Hirotsune et al. ..................... 426/64.1 |

FOREIGN PATENT DOCUMENTS

| | | |
|---|---|---|
| 62-172545 | 7/1987 | Japan . |
| 63-113835 | 5/1988 | Japan . |

*Primary Examiner*—Elizabeth Evans
*Attorney, Agent, or Firm*—Fredrikson & Byron, P.A.

[57] ABSTRACT

An improved optical data storage medium and a method of forming and utilizing such a medium. One such optical data storage medium has a substrate having an upper surface including a series of physical deformations which encode data. A reflective film stack carried by the upper surface of the substrate includes both a reflective layer and an overlayer. The reflective layer is formed of a reflective metal and is able to generate a readable data stream from a reflected data reading light. The overlayer is formed of a material which has a higher Young's modulus and/or a higher modulus of compression than the reflective metal and is less reflective of the reading light than is the reflective metal at the same thickness. A protective layer is carried behind the reflective film stack and may serve to protect the reflective film stack against physical damage and environmental attack.

22 Claims, 2 Drawing Sheets

STRUCTURALLY STABLE OPTICAL DATA STORAGE MEDIUM

FIELD OF THE INVENTION

The present invention relates to optical data storage media generally, and has particular utility in connection with compact discs and digital versatile discs of the type commonly used to record sound, video and other data.

BACKGROUND OF THE INVENTION

Compact discs ("CDs"), digital versatile discs ("DVDs") and other similar discs are commonly used to store large volumes of data in a compact, durable recording medium. Initial applications of such media were for audio recordings, but CDs are increasingly used as a medium for storing computer data as read only memory, commonly referred to as CD ROMs.

Traditional CDs are designed to store a single, unalterable set of data, i.e., the data cannot be changed once the disc is manufactured. In such standard CDs, the disc commonly comprises a substrate which carries a reflective coating and a protective layer over the reflective coating. The substrate is typically formed of a relatively clear plastic material most commonly poly(bisphenol-A carbonate) or polymethylmethacrylate (PMMA) and has a bottom surface and an upper surface. In use, the bottom surface is oriented toward the laser used to read the CD and the upper surface carries the reflective coating. The reflective coating is typically a single layer of aluminum, gold or other reflective metal. The protective layer is typically a curable polymeric resin, e.g., a UV-curable acrylic resin such as a mixture of trimethylol propane triacrylate and neopentyl glycol diacrylate.

DVDs share much in common with the structure of standard CDs, but are configured to store more data on a disc of about the same physical dimensions. One common type of DVD, referred to as a DVD10, is much like two thinner CDs attached to one another. Such DVD10 discs have a pair of relatively thin CD-type structures with the data encoded on one face of a substrate. The data sides of the two thin discs are oriented toward one another and the two discs are then bonded together using an adhesive.

The upper surface of the substrate has a series of physical deformations therein. Typically, these deformations comprise a series of pits arranged in a predetermined fashion in the upper surface of the substrate. These pits are coated with the reflective layer such that the lower face of the reflective layer conforms to the profile of the upper surface, forming a fairly precise reflective interface that follows the molded contours of the substrate.

In use, the disc will be positioned adjacent a light source which emits light at a predetermined wavelength or range of wavelengths. The light source is typically a coherent source, e.g., an infrared laser. A light detector is positioned at a precise location with respect to the light source. The beam of light from the light source is passed through the substrate and strikes the lower face of the reflective layer. This reflected light then passes back through the substrate. The position of the lower face of the reflective layer will vary, resulting in a change in the intensity of the light measured at the light detector. As a result, when the disc is moved laterally with respect to the light source, the variation in the intensity of the light detected by the light detector will generate a readable binary data stream.

Conventional CDs and DVDs do have some potential downfalls, though. The integrity of the data stream generated from the reflected light will depend in large part on the precision of the placement of the reflective layer with respect to the light detector. If the lower face of the reflective layer falls outside of an acceptable range of positions, the reading device may be unable to effectively read the data contained on the disc. This, in turn, can result in unreliable file transfers from a CD ROM or in loss of fidelity of sound reproduction in musical CDs, for example.

The changes in the disc which can lead to improper positioning of the reflective layer with respect to the light source and light detector can be considered as falling into two types. The first is related to "macro" deformations of the disc, such as warping of the disc as a whole. The second potential cause relates to "micro" deformation of the disc in a relatively localized area.

Macro deformations can result from a variety of causes, including mistreatment of the disc itself. One common cause of macro deformations is sharp changes in temperature of the disc. The materials used to form the disc typically have different coefficients of thermal expansion. For example, the protective layer formed on the upper surface of the reflective layer can have a significantly different coefficient of thermal expansion than does the substrate. As the compact disc undergoes significant temperature variations, one side of the disc may expand or contract more rapidly than the other side, causing the disc to curve or bow out.

On a "micro" level, localized heating of the disc can cause similar warping or deformation on a small, localized scale. As noted above, the light source used to read the data from such discs frequently falls in the infrared range. This beam of light will strike a fairly localized area of the disc at any given time. This infrared beam can induce significant localized heating in the area where the beam is striking the compact disc. This is unlikely to cause the entire disc to warp or change shape, but it can change the shape and some dimensions of the precisely molded pits that encode the data carried on the disc.

One of the limitations of conventional CD and DVD structures is the inability to record data on the disc once it has been manufactured. In conventional CDs, there is no way to physically deform the upper surface of the substrate to add additional data to the disc. For this reason, a number of approaches have been developed to provide recordable optical media. In most of these recordable media, the reflectance is varied by inducing a chemical or phase change in a specialized portion of the media in response to a recording signal. These media rely on the chemically induced changes in reflectance to generate the readable data stream rather than relying on physical deformations in the upper surface of the substrate.

The most common types of recordable media rely on two different varieties of chemical or phase changes to alter the reflectance of specified locations on the disc. In one approach, the medium has a layer of a photoreactive compound which changes when illuminated with a specific wavelength or set of wavelengths of light at a sufficient intensity. Typically, when the photoreactive compounds are activated by the activating wavelength of light, they will change reflectance in a different wavelength, such as by changing color in the visible spectrum or infrared. As a result, a different wavelength of light can be used to read the data on the disc by detecting the change in reflectance dictated by the differently colored areas.

The other common type of recordable media relies on the presence of a ferromagnetic layer to allow the user to repeatedly change the data carried by the optical medium. In such a structure, a thin layer of an amorphous ferromagnetic material is applied over the flat, relatively featureless upper surface of a substrate. The ferromagnetic material has a magnetizable axis which is generally perpendicular to the surface of the substrate. Typical materials for this recording medium are combinations of rare earth metals and transition metals, such as alloys of gadolinium, dysprosium, terbium or praseodymium with iron, cobalt or chromium. Examples of magneto-optic recording media utilizing such thin ferromagnetic layers are taught, for example, in U.S. Pat. No. 4,695,510 (Sawamura) and U.S. Pat. No. 5,633,746 (Sekiya), the teachings of both of which are incorporated herein by reference. Two specific compositions known in the art are terbium-iron-cobalt (TbFeCo) films and tellurium-germanium-antimony (TeGeSb) films.

In use, such ferromagnetic recordable optical media are placed in a specialized recording device. The ferromagnetic layer is typically heated in a fairly localized area utilizing a focused beam of infrared light or the like. This increase in temperature makes it easier for the crystals of the ferromagnetic material to reorient themselves in response to a strong magnetic field. The magnetic field adjacent the heated area of the disc can be changed to change the crystalline orientation of the material in one area as compared to the orientation in a different area. These different crystalline orientations result in different reflectance levels at the wavelength of light used in the CD reader. The data recorded in one recording session can typically be recorded over by again inducing localized heating of the ferromagnetic recording layer in the presence of a carefully controlled electrical field.

SUMMARY OF THE INVENTION

The present invention contemplates both optical data storage media and methods for the manufacture thereof. In accordance with one embodiment, an optical data storage medium includes a substrate through which a beam of a predetermined wavelength of light is passed. This substrate has a bottom surface and an upper surface, the upper surface comprising a series of physical deformations which encode data carried by the medium. A reflective film stack is carried by the upper surface of the substrate, the film stack including both a reflective layer and an overlayer. The reflective layer is formed of a reflective metal and is sufficiently reflective of light at said predetermined wavelength and conforms sufficiently to the physical deformations of the substrate to be able to generate a readable data stream from the reflected light. The overlayer is spaced farther from the substrate than the reflective layer. The overlayer is formed of a material which has a higher Young's modulus and/or a higher modulus of compression than the reflective metal and is less reflective of light at said predetermined wavelength than is the reflective metal at the same thickness. A protective layer is carried behind the reflective film stack and may serve to protect the reflective film stack against physical damage and environmental attack.

In another embodiment, the optical data storage medium comprises a substrate having a predetermined number and arrangement of pits formed in an upper surface thereof, with the pits encoding data carried by the medium. A reflective layer formed of a reflective, non-ferromagnetic metal is applied on the upper surface of the substrate. The reflective layer has a thickness of at least about 350 Å and a forward surface which substantially conforms to the pits in the substrate. In use, this forward surface typically serves to reflect light to generate a readable data stream from the reflected light. An overlayer is carried behind the reflective layer, the overlayer being formed of a second metal which has a higher Young's modulus and/or a higher modulus of compression than the reflective, non-ferromagnetic metal of the reflective layer. A protective layer formed of an organic material may be carried behind the overlayer to help protect the overlayer and/or the reflective layer.

A further embodiment of the invention provides a method of forming and utilizing an optical data storage medium. In accordance with this method, a substrate is provided, the substrate having an upper surface comprising a series of physical deformations which encode data carried by the medium. A reflective layer of a reflective, non-ferromagnetic metal is applied on the upper surface of the substrate at a thickness of at least about 350 Å such that the reflective layer has a lower surface which substantially conforms to the upper surface of the substrate and an upper surface comprising a series of dimples. An overlayer of a second, less reflective metal is applied on the substrate layer, the overlayer being applied at a thickness sufficient to substantially fill and mechanically support the dimples in the reflective layer. A protective layer of an organic material is applied on the overlayer. The resulting medium can be placed in proximity to a light source, e.g. a laser, which emits light of at least one predetermined wavelength or range of wavelengths. A beam of light from the light source is passed through the substrate to be reflected back through the substrate by the forward face of the reflective layer for collection and analysis of the reflected light. The overlayer limits thermal deformation of the bottom surface of the reflective layer due to localized heating by the beam of light.

DETAILED DESCRIPTION OF THE PREFERRED EMBODIMENTS

Figure 1:
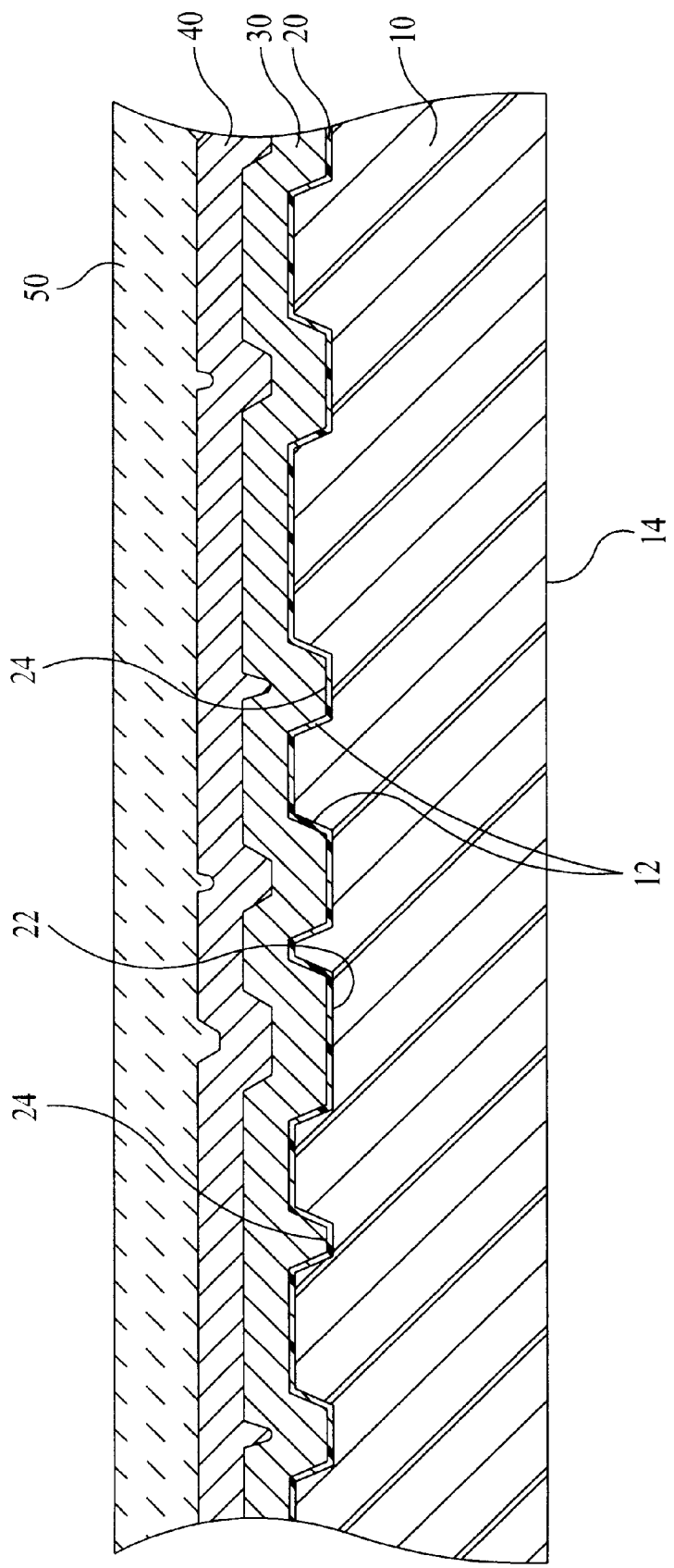
FIG. 1 is a schematic cross sectional view of an optical recording medium manufactured in accordance with the present invention.
Figure 2:
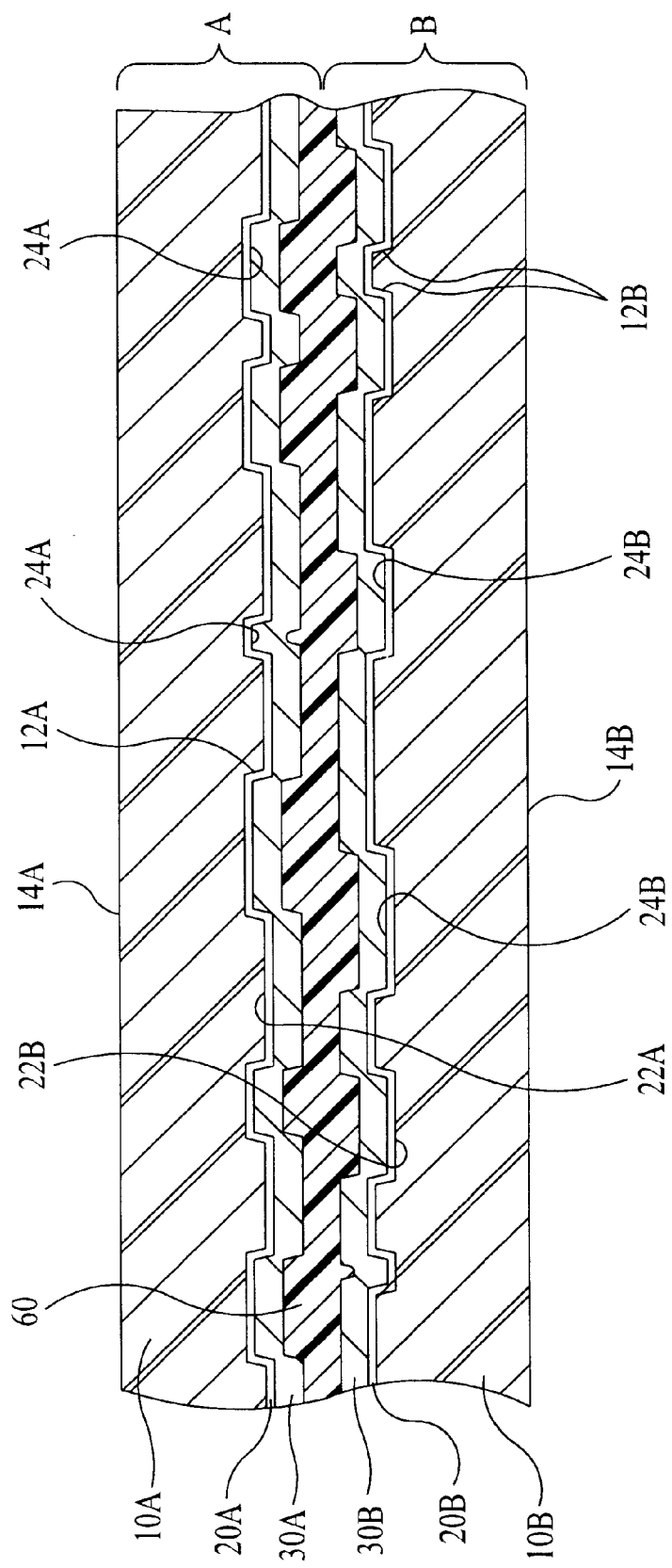
FIG. 2 is a schematic cross sectional view of a DVD disc manufactured in accordance with the present invention.

FIG. 1 is a schematic cross sectional view of one useful embodiment of the invention. (It should be understood that FIGS. 1 and 2 are not to scale; certain features and elements have been exaggerated for purposes of explaining certain concepts.) In FIG. 1, the substrate 10 has a bottom surface 14 which is oriented toward the light source (not shown) when the disc is in use. The upper surface of the substrate 10 has a series of physical deformations or pits 12 formed therein. These pits typically will be formed by injection molding using a "stamper" having projections on its surface to mold the pits 12 in the substrate. The formation of such pits in a regular array to encode a particular set of data is well known in the art and need not be discussed in great detail here.

As noted above, the substrate 10 is commonly formed of a polycarbonate such as poly(bisphenol-A carbonate) or PMMA. The pits 12 are typically on the order of about 1100–1600 Å deep and have a width in the range of 4500–7000 Å (i.e., measured in a direction which is generally perpendicular to the plane of the cross sectional view of FIG. 1). The length of the pits will vary significantly depending on the specific data which is encoded by the pits; it is these variations in the pits that actually define the data carried by the disc. Most commonly, the pit lengths vary from about 4000–40,000 Å. These pits are most commonly generally arcuate in shape to define a spiral data path which spirals outwardly from a location adjacent to (but spaced from) the center of the disc.

A reflective layer 20 is applied over the upper surface of the substrate 10. This is commonly done by sputtering a metal target in a controlled, non-oxidizing atmosphere to deposit a thin metal film on the upper surface of the substrate. As schematically shown in FIG. 1, the lower face 22 of the reflective layer will generally conform to the physical deformations in the upper surface of the substrate. In essence, this makes the upper surface of the substrate reflective so the data encoded by the pits can be read as variations in the intensity of the reflected light.

As shown schematically in FIG. 1, the reflective layer will partially fill the pits 12 in the substrate, but the thickness of the reflective layer 20 is typically less than the depth of the pits. As a consequence, the reflective layer has a series of dimples 24 in its upper face. As suggested in FIG. 1, the location of these dimples will physically correspond to the location of the pits 12 in the substrate. Due to the fact that the pits are partially filled by the reflective layer, though, the dimples will tend to be a little shorter and a little narrower than the underlying pit.

The reflective layer can be formed of any suitable reflective metal, such as aluminum, gold, chromium or silver. In some instances, reflective dielectrics such as silicon nitride or silicon carbide may also suffice. In most commercially manufactured CDs and DVDs, though, the reflective layer is formed of aluminum or gold. A reflective layer 20 of aluminum is usually at least about 500 Å thick, with a thickness of about 900 Å providing a layer which is essentially opaque to the naked eye in typical room lighting. Gold may be applied somewhat thinner yet yield a sufficiently reflective coating. A reflective layer 20 formed of gold is desirably at least about 350 Å, with at least about 400 Å being preferred. A gold reflective layer 20 having a thickness of about 700 Å is highly desirable, yielding a very reflective layer which is virtually opaque to the naked eye in typical room lighting.

In accordance with the present invention, the optical recording medium includes an overlayer 30 which is spaced farther away from the substrate 10 than is the reflective layer 20. In the illustrated embodiment, this overlayer 30 is applied directly on top of the reflective layer 20. If so desired, though, an additional nucleation layer or thermal matching layer can be positioned between the reflective layer 20 and the overlayer 30. Such an intermediate layer could also be used as a chemical barrier if the materials of the reflective layer and the overlayer are likely to react with or migrate or diffuse into one another. For example, if the reflective layer 20 were formed of gold and the overlayer 30 is formed of aluminum, it may be useful to separate these films with a thin layer of titanium, tantalum or molybdenum.

The overlayer 30 is desirably formed of a material which has a higher Young's modulus than the reflective metal of which the reflective layer 20 is formed. If the reflective layer 20 is formed as two or more discrete layers of different reflective metals, the Young's modulus of the overlayer should be greater than at least one of the two reflective metal layers, but it need not be higher than the Young's modulus of each of the reflective metal layers.

As discussed below, a higher Young's modulus is believed to enhance the structural stability of the disc on both a "macro" level and a "micro" level. Particularly on the macro level, the overlayer can be seen as a structural element which is being subjected to bending forces. In any bending-type load, one surface of the object under load will tend to be in tension and the other surface will tend to be in compression. While the Young's modulus of the overlayer is believed to be important in achieving the desired properties of the present invention, the modulus of compression may also be significant. It is possible that a material could be identified having a lower Young's modulus than the reflective layer which would have a sufficiently high modulus of compression to provide the desired structural reinforcement to the resulting optical recording medium. Accordingly, in a preferred embodiment, the modulus of compression of the material of which the overlayer 30 is formed is higher than the modulus of compression of the reflective metal of which the reflective layer 20 is formed.

The material of which the overlayer 30 is formed desirably has a sufficient thermal conductivity and is applied at a thickness to effectively dissipate localized heating of the reflective layer 20 caused by shining a reading light on the reflective layer. It is not necessary that the thermal conductivity of the overlayer be particularly high. For example, the thermal conductivity of the material used to form the overlayer 30 may actually be lower than the thermal conductivity of the reflective metal or metals used to form the reflective layer 20. In addition, a material with a lower thermal conductivity can still serve as an effective heat sink if its specific heat is higher because the high specific heat allows it to absorb more energy for the same increase in temperature.

Most metals would have sufficient thermal conductivity to serve as an effective heat sink to dissipate localized heating in use. It is not believed that the overlayer 30 would dissipate heat very effectively, though, if it is formed a of a highly thermally insulating material such as a common ceramic or dielectric material.

Optimally, the overlayer 30 substantially fills the dimples 24 in the upper surface of the reflective layer 20. In the embodiment schematically shown in FIG. 1, the overlayer substantially fills the pits 12 in the substrate 10 and extends upwardly above the entire upper surface of the substrate. While the upper surface of the overlayer 30 may be somewhat uneven due to the presence of the dimples in the reflective layer, the upper surface of the overlayer will tend to be smoother than the upper surface of the reflective layer.

The precise thickness of the overlayer will vary depending on the material being applied and whether or not a thermal matching layer 40 (described below) is included. However, it is anticipated that an overlayer of at least about 700 Å is necessary to provide optimal performance; typical ranges for commercially manufactured CDs and DVDs would probably be on the order of about 700 Å to about 2500 Å, depending on the material that is used.

The thickness of the overlayer may be varied in combination with the thickness of the reflective layer. It is believed that the combined thickness of the reflective layer 20, the overlayer 30 and the thermal matching layer 40 (if present) should be at least about 80% of the depth of the pits 12. More preferably, the combined thickness of these layers is at least as great as the depth of the pits 12 such that each pit is entirely filled with these metal (and/or dielectric) layers. While there is no theoretical limit to the combined thickness of these layers 20, 30 and 40, it is not believed that the additional benefit provided by these layers at a thickness of more than 2 times the depth of the pits would justify the higher manufacturing costs of such a thick film stack.

As mentioned above, the Young's modulus and/or the modulus of compression of the material used as the overlayer 30 is desirably higher than that of the reflective metal of the reflective layer 20. If the reflective layer 20 is formed of gold or aluminum, for example, the overlayer could be formed of titanium, chromium, molybdenum, nickel, tantalum, palladium, or platinum. Of these materials, palladium and platinum are not believed to be optimal in that they appear to have a tendency to migrate into gold, perhaps degrading the effectiveness of the overlayer 30 and reducing the reflectivity of the reflective layer 20 over time. This problem may be ameliorated by providing an intermediate layer (not shown) between the gold and the overlayer, with the intermediate layer being used as a chemical barrier, as noted above. It is also unnecessary that this overlayer 30 be formed of a ferromagnetic material. Due to costs, availability of sputtering targets, marketing considerations, etc., it is currently believed that an overlayer of titanium applied at a thickness of 800 Å to about 2400 Å would provide a particularly useful commercial product.

The overlayer can be applied in any useful fashion. Most commonly, the overlayer will be formed in the same manner as is the reflective layer 20. In most current commercial manufacturing operations, this would mean that the overlayer is formed by sputtering a target of the desired material in a nonreactive atmosphere to deposit a layer of the desired material directly on the upper surface of the reflective layer 20. For example, a titanium target may be sputtered in a controlled atmosphere which is predominantly argon.

The reflective layer 20 and the overlayer 30 may be considered as comprising a reflective film stack. A protective layer 50 is carried by the optical data storage medium behind this reflective film stack. The protective layer 50 usually will comprise a curable lacquer applied at about 7–8 microns. Any lacquer of the type commonly used in the industry in manufacturing CDs and DVDs (e.g., a lacquer available from DIC Trading Company under the designation SD-211) could be used as the protective layer 50 of a disc of the invention. The precise composition and nature of this protective layer 50 does not form any critical part of the present invention and need not be discussed in any great detail.

If so desired, the protective layer 50 can be applied directly over the upper surface of the overlayer 30. In one particularly preferred embodiment, though, the optical data storage medium further comprises a thermal phase matching layer 40 disposed between the overlayer 30 and the protective layer 50. This thermal matching layer should be formed of a material which has a coefficient of thermal expansion which bears the same relationship to the coefficient of thermal expansion of the reflective metal of the reflective layer 20 as does the material of which the substrate 10 is formed. Most commonly, the substrate 10 will be formed of a polymeric material having a coefficient of thermal expansion higher than the coefficient of thermal expansion of the reflective metal layer. In order to counter the potential warping effects of expansion of this substrate as the temperature of the optical storage medium is increased, the coefficient of thermal expansion of the thermal matching layer 40 should also be greater than that of the reflective metal layer 20. If the material of which the substrate is formed were to have a coefficient of thermal expansion lower than that of the reflective metal layer 20, it would be preferred that the thermal matching layer also have a coefficient of thermal expansion which is lower than that of the reflective layer 20.

By way of example, one embodiment of the invention employs a substrate 10 formed of a polycarbonate having a coefficient of thermal expansion of about $67 \times 10^6$ cm/cm ° C. is provided with a reflective layer 20 of gold (coefficient of thermal expansion of about $14.2 \times 10^6$ cm/cm ° C.) and an overlayer 30 of titanium (coefficient of thermal expansion of about $8.4 \times 10^6$ cm/cm ° C.). In such an embodiment, a thermal matching layer 40 optimally has a coefficient of thermal expansion which is greater than $14.2 \times 10^6$ cm/cm ° C., the coefficient of thermal expansion for gold. Metals having a suitable coefficient of thermal expansion are copper ($16.6 \times 10^6$ cm/cm ° C.), zinc ($35 \times 10^6$ cm/cm ° C.) and tin ($20 \times 10^6$ cm/cm ° C.). While no particularly advantageous polymeric material has been identified, it is also believed that numerous polymeric materials could be used advantageously as the thermal matching layer 40.

FIG. 2 is a schematic illustration of a DVD disc manufactured in accordance with the present invention. As noted above, at least one current standard for DVDs can be considered as two thin CD-like structures which are adhered to one another. In FIG. 2, this can be seen as an upper CD-like structure A and a lower CD-like structure B. These two structures are bonded to one another by an adhesive layer 60 which is in contact with the pits of both of these CD-like structures.

The structures of each of these CD-like layers A and B are analogous to the layers illustrated in FIG. 1. Accordingly, each of the layers of these two CD-like structures bear reference numerals which are analogous to the reference numbers used in FIG. 1, but bearing the designation A if they are part of the upper CD-like structure and the designation B if they are part of the lower CD-like structure.

In this illustrated embodiment, the outer surface 14A of the upper CD-like structure's substrate is oriented upwardly while the outer surface 14B of the lower CD-like structure's substrate defines the lower face of the DVD. Each of the CD-like structures has a reflective layer (20A or 20B) and an overlayer (30A or 30B), much like the structure illustrated in FIG. 1. The structure shown in FIG. 2 does not include a thermal matching layer 40 such as that shown in FIG. 1. This illustrates that such a thermal matching layer is entirely optional; if one so desired, such a thermal phase matching layer could be included in one or both of the CD-like structures A and B. It is worth noting, though, that the DVD structure shown in FIG. 2 has a rough symmetry about a horizontal plane extending along the middle of the adhesive layer 60. This is believed to minimize the utility of such a thermal matching layer 40 because the macro warping effects of differences in the coefficient of thermal expansion of the elements of one CD-like structure would be roughly balanced by the same effects on the layers of the other CD-like structure.

An optical data storage medium of the present invention has a number of advantages over the conventional CD or DVD structure currently used in commercial production. First, the overlayer 30 provides structural support to the optical storage medium on both a "macro" level and a "micro" level. On a macro level, the higher Young's modulus of the overlayer, combined with its increased thickness, will add structure rigidity to the disc as a whole. As a consequence, the overlayer will make it more difficult for the disc to warp or bow under either direct mechanical stress or under the stresses induced by temperature changes, as discussed above.

The overlayer 30 of the invention also helps improve performance of the optical data storage medium on a more localized, "micro" level. As discussed above and as schematically illustrated in FIG. 1, the overlayer 30 desirably substantially fills the dimples 24 in the upper surface of the reflective layer. As a consequence, this overlayer will tend to mechanically support the dimples and limit the bending of the reflective layer 20. In addition to the mechanical support, though, a suitably selected overlayer 30 can also serve to fairly effectively dissipate localized heating of the reflective layer caused by the reading light. By carrying away the heat generated by the light source reflecting from the reflective layer, the mechanical stresses which would otherwise be placed on the reflective layer and the substrate due to the differences in thermal expansion thereof will be significantly reduced. As a consequence, the reflective layer and the upper surface of the substrate will tend to maintain the integrity of its physical structure in use, further enhancing the fidelity of the data scanned from the recording medium.

As explained previously, the present invention also contemplates a method of manufacturing an optical data storage medium. In the following discussion, reference will be made to the structure and reference numbers shown in FIG. 1. It should be understood, though, that the method of the invention need not be used solely to manufacture the specific structure shown in FIG. 1. Many other structures which would result from the method of the invention could also be produced and the following discussion should be read accordingly.

In accordance with one embodiment of a method of the invention, a substrate 10 having pits 12 in its upper surface is provided. A reflective layer of a reflective, non-ferromagnetic material is applied to the upper surface of the substrate. As explained above, the thickness of this reflective metal layer may vary depending on the reflective metal being used. Most commonly, though, the reflective layer 20 will be at least about 350 Å, with a thickness of at least about 400 Å being preferred for gold, and a thickness of 500 Å or more being preferred for aluminum.

This reflective layer can be formed in any suitable fashion. Most commonly, though, the reflective layer will be formed by sputter deposition, as mentioned above. The resulting reflective layer 20 will have a forward surface 22 which substantially conforms to the upper surface of the substrate 10.

Once the reflective layer has been applied to the substrate, an overlayer of a second, less reflective metal may be applied to the reflective layer. The overlayer is desirably applied at a thickness which is sufficient to substantially fill and mechanically support the dimples 24 in the reflective layer 20. As mentioned above, the overlayer 30 will typically be applied directly on top of the upper surface of the reflective layer 20 by sputter deposition.

A protective layer of an organic material, such as an ultraviolet light (UV) curable acrylic resin lacquer, can be applied above the overlayer 30. The protective layer may be applied directly on top of the upper surface of the overlayer 30. As noted previously, the materials and method of application of such a protective lacquer coating are well known in the art and the process of applying such a protective layer is well within the level of skill of the skilled artisan.

If so desired, a thermal phase matching layer 40 can be applied between the overlayer 30 and the protective layer 50. The thermal phase matching layer 40 will be applied over the top of the overlayer 30 before the protective layer 50 is formed. The manner in which the thermal phase matching layer 40 is applied will depend on what material is selected. If the thermal matching layer 40 is to be formed of a metal, it may also be formed by sputtering a metal target in a non-reactive atmosphere. If a dielectric material is used, it may be formed by sputtering a metal target in a reactive atmosphere to yield the desired dielectric. If an organic material is used, it can be applied in a manner which is appropriate to the particular material selected.

The resulting optical data storage medium can then be used to read the data encoded thereon. This will be done in a standard fashion. As explained previously, this would involve directing a light from a light source of a predetermined wavelength or range of wavelengths through the substrate 10. This light will strike the lower face 22 of the reflective layer 20 and travel back to the substrate 10 for collection on a photodiode or other light detector. The variations in the reflected intensity attributable to the presence of the pits 12 and the substrate will result in a readable data stream being generated as the optical data storage medium is moved with respect to the light source. As explained previously, the overlayer 30 will limit thermal deformation of the front surface 22 of the reflective layer due to localized heating by the beam of light used to read the disc.

While a preferred embodiment of the present invention has been described, it should be understood that various changes, adaptations and modifications may be made therein without departing from the spirit of the invention and the scope of the appended claims.

What is claimed is:

1. An optical data storage medium, comprising:
   a. a substrate through which a beam of a predetermined wavelength of light is passed, the substrate having a bottom surface and an upper surface, the upper surface comprising a series of pits shaped and arranged to define data carried by the medium;
   b. a reflective film stack carried by the upper surface of the substrate, the film stack comprising:
      (i) a reflective layer formed of a reflective metal, the reflective layer being sufficiently reflective of light of said predetermined wavelength and having a forward face substantially conforming to a profile of the pits to enable generation of a readable data stream from the reflected light; and
      (ii) an overlayer spaced farther from the substrate bin and reflective layer, the overlayer being formed of a material which has a higher Young's modulus than a reflective metal and is less reflective of light at said predetermined wavelength than is said reflective metal of the same thickness; and
   c. a protective layer carried behind the reflective film stack.

2. The medium of claim 1 wherein the overlayer comprises a metal selected from the group consisting of titanium, chromium, molybdenum, nickel, palladium, platinum, tantalum and alloys of titanium, chromium, molybdenum, nickel, palladium, platinum or tantalum.

3. The medium of claim 1 wherein the overlayer substantially fills the pits.

4. The medium of claim 1 wherein the overlayer is formed of a thermally conductive material and has a thickness sufficient to effectively dissipate localized heating of the reflective layer caused by the reading light.

5. The medium of claim 1 wherein the material of the overlayer and the material of the substrate each have a coefficient of thermal expansion greater than that of the reflective metal.

6. The medium of claim 1 further comprising a thermal matching layer disposed between the overlayer and the protective layer, both the substrate and the thermal matching layer being formed of a material having a coefficient of thermal expansion greater than that of the reflective metal.

7. The medium of claim 1 further comprising a thermal matching layer disposed between the overlayer and the protective layer, both the substrate and the thermal matching layer being formed of a material having a coefficient of thermal expansion less than that of the reflective metal.

8. An optical data storage medium comprising:
   a) a substrate having a predetermined number and arrangement of pits formed in an upper surface thereof, the pits encoding data carried by the medium;
   b) a reflective layer formed of a reflective, non-ferromagnetic metal applied on the upper surface of the substrate, the reflective layer having a thickness of at least about 350 Å and a forward surface which substantially conforms to the pits in the substrate;
   c) an overlayer carried behind the reflective layer, the overlayer being formed of a second metal which has a higher Young's modulus than the reflective, non-ferromagnetic metal; and
   d) a protective layer formed of an organic material carried behind the overlayer.

9. The medium of claim 8 wherein the overlayer comprises a metal selected from the group consisting of titanium, chromium, molybdenum, nickel, palladium, platinum, tantalum and alloys of titanium, chromium, molybdenum, nickel, palladium, platinum or tantalum.

10. The medium of claim 8 wherein the reflective layer has a top surface comprising a series of dimples, the overlayer substantially filling and mechanically supporting the dimples in the reflective layer.

11. The medium of claim 10 wherein the overlayer limits thermal deformation of the bottom surface of the reflective layer due to localized heating by the beam of light.

12. The medium of claim 8 wherein the overlayer is formed of a material having a Young's modulus greater than that of the reflective, non-ferromagnetic metal.

13. The medium of claim 8 wherein the overlayer is formed of a thermally conductive material and has a thickness sufficient to effectively dissipate localized heating of the reflective layer caused by the reading light.

14. The medium of claim 8 wherein the material of the overlayer and the material of the substrate each have a coefficient of thermal expansion greater than that of the reflective metal.

15. The medium of claim 8 further comprising a thermal matching layer disposed between the overlayer and the protective layer, the material of the thermal matching layer and the material of the substrate each having a coefficient of thermal expansion greater than that of the reflective metal.

16. A method of forming and utilizing an optical data storage medium, comprising:
   a) providing a substrate having an upper surface comprising a series of physical deformations which encode data carried by the medium;
   b) applying on the upper surface of the substrate a reflective layer of a reflective, non-ferromagnetic metal at a thickness of at least about 350 Å such that the reflective layer has a forward surface which substantially conforms to the upper surface of the substrate and a rearward surface comprising a series of dimples;
   c) applying on the substrate layer an overlayer of a second metal which is less reflective than the reflective, non-ferromagnetic metal, the overlayer being applied at a thickness sufficient to substantially fill and mechanically support the dimples in the reflective layer;
   d) applying on the overlayer a protective layer of an organic material; and
   e) passing a beam of a predetermined wavelength of light through the substrate to be reflected back through the substrate by the forward face of the reflective layer for collection and analysis of the reflected light, the overlayer limiting thermal deformation of the bottom surface of the reflective layer due to localized heating by the beam of light.

17. The method of claim 16 further comprising applying a thermal matching layer after applying the overlayer but before applying the protective layer, the both the substrate and the thermal matching layer being formed of a material having a coefficient of thermal expansion greater than that of the reflective, non-ferromagnetic metal.

18. The method of claim 16 further comprising applying a thermal matching layer after applying the overlayer but before applying the protective layer, the both the substrate and the thermal matching layer being formed of a material having a coefficient of thermal expansion less than that of the reflective, non-ferromagnetic metal.

19. The method of claim 16 wherein the overlayer is formed by sputtering in a non-oxidizing atmosphere a target comprising a metal selected from the group consisting of titanium, chromium, molybdenum, nickel, palladium, platinum, tantalum and alloys of titanium, chromium, molybdenum, nickel, palladium, platinum or tantalum.

20. An optical data storage medium, comprising:
   a. a substrate through which a beam of a predetermined wavelength of light is passed, the substrate having a bottom surface and an upper surface, the upper surface comprising a series of physical deformations which encode data carried by the medium, the substrate being formed of a material having a first coefficient of thermal expansion;
   b. a reflective film stack carried by the upper surface of the substrate, the film stack comprising:
      (i) a reflective layer formed of a reflective metal having a second coefficient of thermal expansion, the reflective layer being sufficiently reflective of light of said predetermined wavelength and conforming sufficiently to the physical deformations of the substrate to be able to generate a readable data stream from the reflected light; and
      (ii) an overlayer spaced farther from the substrate than the reflective layer, the overlayer being formed of a material having a third coefficient of thermal expansion and which has a higher Young's modulus than the reflective metal and is less reflective of light at said predetermined wavelength than is said reflective metal at the same thickness; and
   c. a protective layer carried behind the reflective film stack;
   the first and third coefficients of thermal expansion being greater than the second coefficient of thermal expansion.

21. An optical data storage medium comprising:
   a. a substrate through which a beam of a predetermined wavelength of light is passed, the substrate having a bottom surface and an upper surface, the upper surface comprising a series of physical deformations which encode data carried by the medium;
   b. a reflective film stack carried by the upper surface of the substrate, the film stack comprising:
      (i) a reflective layer formed of a reflective metal, the reflective layer being sufficiently reflective of light of said predetermined wavelength and conforming sufficiently to the physical deformations of the substrate to be able to generate a readable data stream from the reflected light; and
      (ii) an overlayer spaced farther from the substrate than the reflective layer, the overlayer being formed of a material which has a higher Young's modulus than the reflective metal and is less reflective of light at said predetermined wavelength than is said reflective metal at the same thickness;

c. a protective layer carried behind the reflective film stack; and d. a thermal matching layer disposed between the overlayer and the protective layer, both the substrate and the thermal matching layer being formed of a material having a coefficient of thermal expansion greater than that of the reflective metal.

22. An optical data storage medium comprising:

a. a substrate through which a beam of a predetermined wavelength of light is passed, the substrate having a bottom surface and an upper surface, the upper surface comprising a series of physical deformations which encode data carried by the medium;

b. a reflective film stack carried by the upper surface of the substrate, the film stack comprising:

(i) a reflective layer formed of a reflective metal, the reflective layer being sufficiently reflective of light of said predetermined wavelength and conforming sufficiently to the physical deformations of the substrate to be able to generate a readable data stream from the reflected light; and (ii) an overlayer spaced farther from the substrate than the reflective layer, the overlayer being formed of a material which has a higher Young's modulus than the reflective metal and is less reflective of light at said predetermined wavelength than is said reflective metal at the same thickness;

c. a protective layer carried behind the reflective film stack; and d. a thermal matching layer disposed between the overlayer and the protective layer, both the substrate and the thermal matching layer being formed of a material having a coefficient of thermal expansion less than that of the reflective metal.

* * * * *